United States Patent
So et al.

(10) Patent No.: US 9,401,888 B2
(45) Date of Patent: Jul. 26, 2016

(54) INTERNET PROTOCOL MAPPING RESOLUTION IN FIXED MOBILE CONVERGENCE NETWORKS

(75) Inventors: Tricci So, San Diego, CA (US); Zaifeng Zong, Nanjing (CN); Xiaoyun Zhou, Nanjing (CN); Yifeng Bi, Nanjing (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 94 days.

(21) Appl. No.: 13/985,870

(22) PCT Filed: Feb. 15, 2012

(86) PCT No.: PCT/US2012/025304
§ 371 (c)(1),
(2), (4) Date: Dec. 26, 2013

(87) PCT Pub. No.: WO2012/112719
PCT Pub. Date: Aug. 23, 2012

(65) Prior Publication Data
US 2014/0129839 A1    May 8, 2014

Related U.S. Application Data

(60) Provisional application No. 61/443,205, filed on Feb. 15, 2011, provisional application No. 61/468,539, filed on Mar. 28, 2011, provisional application No. 61/499,164, filed on Jun. 20, 2011, provisional application No. 61/551,397, filed on Oct. 25, 2011.

(51) Int. Cl.
*H04L 9/32* (2006.01)
*H04L 29/12* (2006.01)
(Continued)

(52) U.S. Cl.
CPC ............... *H04L 61/15* (2013.01); *H04L 9/0819* (2013.01); *H04L 61/2514* (2013.01);
(Continued)

(58) Field of Classification Search
None
See application file for complete search history.

(56) References Cited

U.S. PATENT DOCUMENTS 7,990,912 B2 *  8/2011  Nix, Jr. ............... H04L 41/0856
                                                      370/328
8,804,682 B2    8/2014  Hirano et al.
(Continued)

FOREIGN PATENT DOCUMENTS

CN      101369959 A      2/2009
CN      101426030 A      5/2009
(Continued)

OTHER PUBLICATIONS

International Search Report and Written Opinion mailed on Oct. 31, 2012 for International Application No. PCT/US2012/025304, filed Feb. 15, 2012 (7 pages).
(Continued)

*Primary Examiner* — Jason K. Gee
*Assistant Examiner* — Olanrewaju Bucknor
(74) *Attorney, Agent, or Firm* — Perkins Coie LLP

(57) ABSTRACT

Techniques for facilitating operation of a communication device having a first internet protocol (IP) address in a first network and a second IP address in a second network include detecting a presence of a network address translation (NAT) table; implementing, when the NAT table is present, a message exchange protocol to obtain a mapping between the first IP address and the second IP address; and reporting, in a communication message, the mapping between the first IP address and the second IP address. In one operational scenario, the first network is a 3 GPP network and the second network is a broadband fixed network such as a DSL or a cable modem network.

24 Claims, 13 Drawing Sheets

(51) Int. Cl.
*H04W 8/26* (2009.01)
*H04L 9/08* (2006.01)
*H04W 84/04* (2009.01)
*H04L 29/06* (2006.01)

(52) U.S. Cl.
CPC ....... *H04L 61/2567* (2013.01); *H04L 61/2592* (2013.01); *H04W 8/26* (2013.01); *H04L 63/164* (2013.01); *H04W 84/045* (2013.01)

(56) References Cited

U.S. PATENT DOCUMENTS

| | | | |
|---|---|---|---|
| 2006/0098622 A1 | 5/2006 | Chang et al. | |
| 2006/0120366 A1* | 6/2006 | Jayasenan et al. | 370/389 |
| 2006/0239266 A1 | 10/2006 | Babbar et al. | |
| 2007/0071228 A1 | 3/2007 | Zhu et al. | |
| 2007/0291733 A1 | 12/2007 | Doran et al. | |
| 2008/0247541 A1 | 10/2008 | Cholas et al. | |
| 2010/0077064 A1* | 3/2010 | Viger et al. | 709/221 |
| 2011/0019682 A1 | 1/2011 | Zhu | |
| 2011/0222436 A1* | 9/2011 | Zee et al. | 370/254 |
| 2011/0228750 A1* | 9/2011 | Tomici et al. | 370/338 |
| 2012/0039323 A1* | 2/2012 | Hirano | H04W 36/385 370/338 |
| 2012/0071168 A1* | 3/2012 | Tomici et al. | 455/445 |
| 2012/0182940 A1* | 7/2012 | Taleb | H04L 29/12066 370/328 |
| 2012/0214445 A1* | 8/2012 | Stojanovski et al. | 455/411 |
| 2013/0028237 A1* | 1/2013 | Cheng | H04W 36/0016 370/331 |

FOREIGN PATENT DOCUMENTS

| | | |
|---|---|---|
| CN | 101562601 A | 10/2009 |
| WO | 2006/015551 A1 | 2/2006 |
| WO | 2010/119707 A1 | 10/2010 |

OTHER PUBLICATIONS

Kaufman, C., et al., "Internet Key Exchange Protocol Version 2 (IKEv2)," Internet Engineering Task Force (IETF), Request for Comments: 5996, Obsoletes: 4306, 4718, Category: Standards Track, ISSN: 2070-1721, pp. 1-138, Sep. 2010.

Office Action dated Sep. 23, 2014 for Taiwanese Application No. 101104855, filed Feb. 15, 2012 (8 pages with translation).

Office Action dated Dec. 31, 2014 for Taiwanese Application No. 101104855, filed Feb. 15, 2012 (11 pages with translation).

Office Action dated Jul. 17, 2015 for Chinese Application No. 201280018439.6, filed Feb. 15, 2012 (7 pages).

* cited by examiner

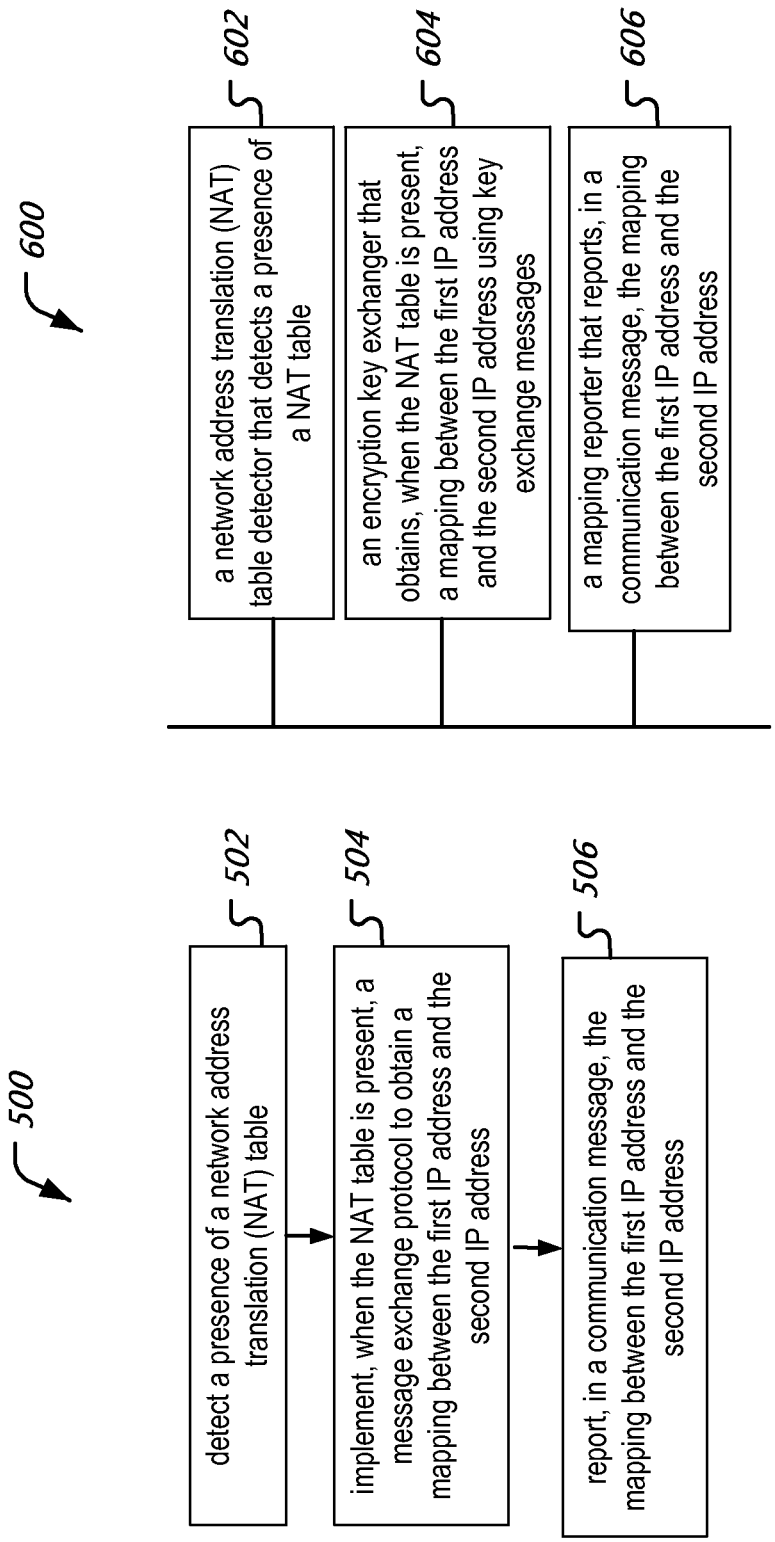

INTERNET PROTOCOL MAPPING RESOLUTION IN FIXED MOBILE CONVERGENCE NETWORKS

CROSS REFERENCE TO RELATED APPLICATIONS

This patent document claims the benefit of priority of U.S. Provisional Patent Application No. 61/551,397, entitled "Fixed Mobile Convergence IP Mapping Resolution Over Network Address Translation (NAT) For Policy Control Support," filed on Oct. 25, 2011; U.S. Provisional Patent Application No. 61/499,164, entitled "Fixed Mobile Convergence IP Mapping Resolution Over Network Address Translation (NAT) For Policy Control Support," filed on Jun. 20, 2011; and U.S. Provisional Patent Application No. 61/468,539, entitled "Fixed Mobile Convergence IP Mapping Resolution Over Network Address Translation (NAT) For Policy Control Support," filed on Mar. 28, 2011; and U.S. Provisional Patent Application No. 61/443,205, entitled "Fixed Mobile Convergence IP Mapping Resolution Over Network Address Translation (NAT) For Policy Control Support," filed on Feb. 15, 2011.

The entire contents of the above-referenced provisional patent applications are incorporated by reference as a part of this patent document.

TECHNICAL FIELD

This document relates to systems, devices and techniques for wireless communications, including wireless communications provided via different networks or infrastructures such as services provided by using both a mobile wireless network and a fixed line network.

BACKGROUND

This patent document relates to wireless communications, wireless communication devices, wireless communications systems and related methods.

Fixed Mobile Convergence (FMC) is the convergence and blending of one or more fixed communication/telephony networks, infrastructures and services/applications, with one or more mobile communication/telephony networks, infrastructures and services/applications. For example, FMC can be used to provide communication and data services to mobile users by using both fixed lines services and mobile services and FMC offers a way to connect a mobile device to a fixed line infrastructure so that operators can provide services to their users irrespective of their location, access technology, and terminal. FMC enables converged services across the fixed, mobile and internet environments. In FMC, the same handset can access the services through a fixed network in addition to a wireless network. It can be used in home or office and also while traveling.

Techniques are needed for enabling address resolution in Fixed Mobile Convergence networks.

SUMMARY

This document describes technologies, among other things, for accounting of packet data connections in wireless communications networks.

In one aspect, a method of facilitating operation of a communication device having a first internet protocol (IP) address in a first network and a second IP address in a second network is disclosed. A presence of a network address translation (NAT) table is detected. When the NAT table is present, a message exchange protocol to obtain a mapping between the first IP address and the second IP address is implemented. The mapping between the first IP address and the second IP address is reported in a communication message.

In another aspect, an apparatus for facilitating operation of a communication device having a first internet protocol (IP) address in a first network and a second IP address in a second network is disclosed. The apparatus includes a network address translation (NAT) detector that detects a presence of a NAT table, an encryption key exchanger that obtains, when the NAT table is present, a mapping between the first IP address and the second IP address using key exchange messages, and a mapping reporter that reports, in a communication message, the mapping between the first IP address and the second IP address.

In yet another aspect, a communications system includes a home enode B (HeNB) that provides access to a wide area wireless network via a fixed broadband network, a security gateway that facilitates secure transmission between the femto base station and the wide area wireless network, and an HeNB Management Server (HeMS) that provides the HeNB information about a mapping between a first internet protocol (IP) address and a second (IP) address.

In yet another aspect, a disclosed method of operating a network equipment (NE), comprises providing access to the NE to a wireless network over a fixed network, and enforcing a service policy for the NE by generating and a mapping between an inner internet protocol (IP) address by which the NE is addressable in the wireless network and an outer IP address by which the NE is addressable in the fixed network.

The details of one or more implementations are set forth in the accompanying attachments, the drawings, and the description below. Other features will be apparent from the description and drawings, and from the claims.

BRIEF DESCRIPTION OF THE DRAWINGS

FIG. 5 is a flow chart representation of a communications method.

FIG. 6 is a block diagram representation of a portion of a communications apparatus.

Like reference symbols in the various drawings indicate like elements.

DETAILED DESCRIPTION

In the description below, techniques are provided to identify and correlate multiple internet protocol (IP) addresses by which a communications device is addressable. The mapping between IP addresses is also made known to servers and entities in a network to enable policy enforcement to the communications device.

In one operational scenario, the techniques disclosed in this document could be used to operate a wireless communications device such as a 3G or 4G cell phone in a femtocell established by a femto base station deployed in a user's home. The femto base station is in communication with the cell phone service provider's network via IP connectivity through a broadband IP connection to the home (e.g., DSL or cable modem). In one aspect, the disclosed technique allow a policy enforcement function in the cell phone service provider's network to communicate with a policy enforcement function in the broadband home connection network and provide service policy information for enforcing on the traffic to/from the communications device or the femto base station.

Figure 1:
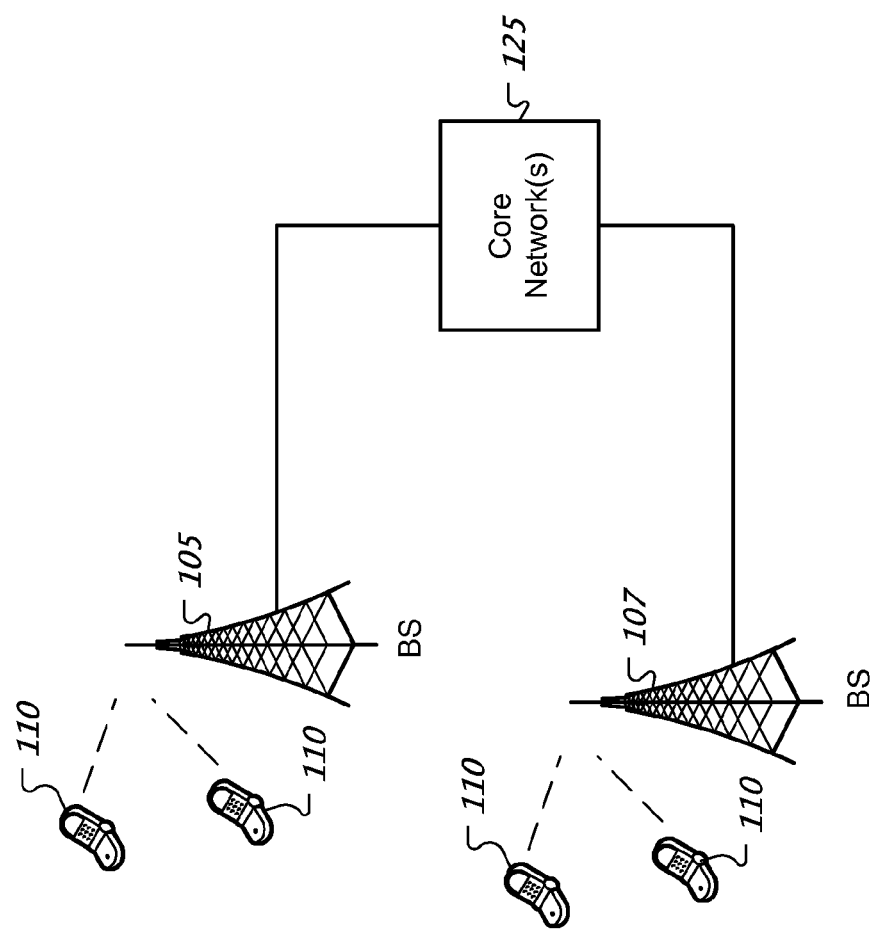
FIG. 1 illustrates an example wireless communications network.

FIG. 1 shows an example of a wireless communication system. A wireless communication system can include one or more base stations (BSs) 105, 107 and one or more wireless devices 110. A base station 105, 107 can transmit a signal on a forward link (FL), or a downlink (DL), to one or more wireless devices 110. A wireless device 110 can receive a signal from a base station via the respective forward link (FL) or a downlink (DL), and can transmit a signal on a reverse link (RL), or uplink (UL), to one or more base stations 105, 107. A wireless communication system can include one or more core networks 125 to control one or more base stations. In some implementations, a wireless communication system can include different access networks (ANs) for different radio access technologies (RATs).

Base stations 105, 107 can be configured to operate based on or use same or different wireless technologies. For example, one base station 105 can use E-UTRAN technology and a different base station 107 can use eHRPD technology. Examples of wireless communication systems that can implement the present techniques and systems include, among others, wireless communication systems based on Code Division Multiple Access (CDMA) such as CDMA2000 1x, High Rate Packet Data (HRPD), Evolved High Rate Packet Data (eHRPD), Evolved Universal Terrestrial Radio Access Network (E-UTRAN), the Worldwide Interoperability for Microwave Access (WiMAX) technology and a WiFi technology under an IEEE 802.11 standard. A wireless device 110 can be configured to use one or more RATs such as HRPD, eHRPD, and E-UTRAN.

As an example, the wireless communication system in FIG. 1 can be based on CDMA2000 as defined in 3GPP2.

Figure 2:
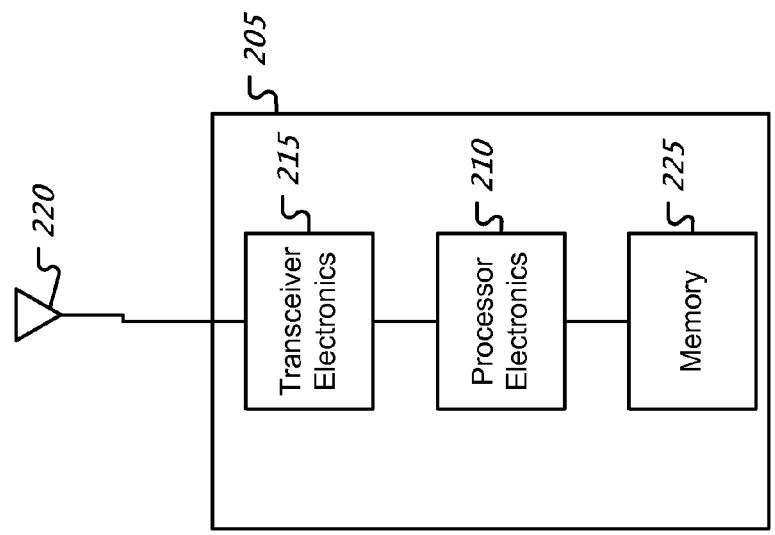
FIG. 2 is a block diagram representation of a wireless radio communications apparatus.

FIG. 2 shows an example radio station architecture for a wireless communication device 110 or a base station 105 or 107 in FIG. 1. A radio station 205 in this example includes processor electronics 210 such as a microprocessor that implements methods such as one or more of the wireless communication techniques presented in this document. The radio station 205 includes transceiver electronics 215 to send and/or receive wireless signals over one or more communication interfaces such as an antenna 220. The radio station 205 can include other communication interfaces for transmitting and receiving signaling and data. The radio station 205 can include one or more memories configured to store information such as data and/or instructions.

In the FMC architecture, it is very possible that, the fixed network operator, which manages the outer IP of the NE and the NA(P)T, is not the same mobile operator of the NE at the customer premises (CPE, e.g. Femto/H(e)NodeB). On the other hand, the Policy Charging Rule Function (PCRF), which belongs to the same mobile operator as the NE, is required to communicate with the local PF (e.g. Broadband Policy Control Function (BPCF)) of the fixed network in order to install the necessary policy (e.g. broadband resource allocation policy) to support the NE's operation for its attached user devices.

In circumstances where the CPE type of the NE could be just plugged and played without the mobile operator's physical intervention, it is not always possible to predict to which the local PF (e.g. BPCF) in the fixed access network that is assigned to serve the NE. The PF needs the location information to identify the BPCF at the fixed access network for it to communicate the policy information for the given NE. One of the solutions is to refer to the public IP address of the NE which was assigned by the fixed access network so that the mobile core network can derive the estimated location of the NE.

To make the network architecture even more complex, due to the security consideration for the network access for the FMC devices to attach to its serving access gateway (e.g. H(e)NB GW), an IPSec/IKEv2 VPN tunnel will be established between the NE and the Security Gateway (SeGW) prior to the NE's traffic reaching to its serving access gateway over the NAT as well as over the fixed network access gateway (e.g. Enhanced Broadband Network Gateway (eBNG)).

As the PF of the NE will only have the knowledge of the Inner-IP of the NE which is also used as an identifier to support the management of the NE's policy, if the policy is required to be provided by the NE's PF to the local PF (e.g. BPCF) so that the interworking policy for the NE can be installed at the fixed network access gateway (e.g. eBNG) for local policy enforcement and admission control, the fixed network's access gateway that serves the NE will require the identification of the traffic based on the outer IP because the fixed network access gateway cannot recognize the Inner-IP that is encrypted within the IPSec tunnel.

Hence, there exists a need to resolve the mapping of the Private IP address to the NATed IP address between the two operators to locate NE at the customer premises managed by the fixed network operator. And, the way to learn about the location of the NE is based on the broadband network assigned public IP address, more specifically, in the case when NAT/NAPT is between the NE and the SeGW, it is the NATed Tunnel-IP address that needs to be recognized by the NE The techniques provided in this document resolve the network element's (NE's) UDP Private Tunnel-IP to NATed UDP Tunnel-IP mapping when a Network Address Translation (NAT/NAPT) which is managed by the fixed broadband access network is implemented. For this given scenario, the NE is the H(e)NB and is located at the customer premises, whereas the SeGW is located at the mobile core network. In addition, the Policy Charging Rule Function (PCRF) which serves the NE is also resided at the mobile core network.

Note that, while several embodiments in the context of the IKEv2 IPSec Tunnel Mode operation over NAT/NAPT are disclosed, UDP encapsulation is assumed to be user to carry the ESP/AH IPSec packet.

In some operational scenarios, the resolution of the mapping of the H(e)NB's Private Tunnel-IP and the NATed Tunnel-IP address based on the following premises:

(1) the SeGW will have the knowledge of the mapping between the H(e)NB's Inner-IP with the H(e)NB's NATed Tunnel-IP, whereas (2) the H(e)NB will have the knowledge of the Private Tunnel-IP in the beginning until this invention is executed to resolve the mapping between the H(e)NB's Private Tunnel-IP and NATed Tunnel-IP.

As used in the document, the term "NATed" refers to the translation of the private IP address with or without the port number to the public IP address with or without the port number by the NA(P)T.

As used in this document, the term "NATed Tunnel-IP" refers to the Private Tunnel IP (with or without the port number) is translated by the NA(P)T. More specifically, the "Tunnel-IP" here-in refers to the UDP encapsulated IPSec tunnel as according to the RFC 5996 NAT Traversal procedures for IPSec Tunnel Mode operation when NA(P)T is detected to be present between the IKE's initiator and IKE's responder.

As used in this document, the term H(e)NB here-in refers to general reference of HNB and HeNB.

Mapping between the Inner-IP to the Outer-IP over the NAT can be achieved and be used to enable the serving PF to pass on the NE's associated policy to the fixed network access gateway (e.g. eBNG) to identify the NE's traffic based on the Outer-IP identity and to assert the appropriate admission control and policy enforcement over the fixed network infrastructure.

In the Fixed Mobile Convergence (FMC) deployment scenario, there will be mobile network element, which is part of the mobile access network, to leverage the fixed access network infrastructure to interconnect to the mobile core network. Under the circumstances where the mobile and the fixed networks are operated by two different operators, it is necessary to coordinate the addressing and policy control among the network elements over the two network infrastructures, so that, the impact to the user experience to access such converged network is as seamless as possible.

Techniques are provided in this document for resolving the mapping among the Inner-IP with the Outer-IP (including both the Private-IP and the Public-IP when NAT is deployed in the fixed access network and is between the NE that is resided at the customer premises whereas the PF is resided at the NE's core network). The described techniques can be implemented to reuse the existing interfaces to integrate the solution into the FMC architecture without the overhead of the tedious manual configurations.

One approach to supporting the FMC architecture is to use the PF of the mobile network to communicate the network attachment policy (e.g. QoS policy) with the PF of the fixed network in order to support the admission control and the policy enforcement decisions for the attaching mobile access network element (NE—e.g. H(e)NB) as well as its associated user traffic. In this approach, in order to enable the network access policy to be enforced over the fixed network infrastructure, the NE's QoS policy can be installed at the Enhanced Broadband Network Gateway (eBNG) which is part of the fixed network infrastructure. A few technical issues are present in this approach. For example, the network access policy which is originally managed by the PF at the mobile network based on mobile network assigned IP address (i.e. Inner-IP) may not be recognized by the fixed network. Hence, when the fixed network is required to exert the admission control and policy enforcement to the attached mobile access NE (e.g. H(e)NB), it is necessary to ensure the fixed network element (e.g. BPCF, BNG etc.) can identify the correct target mobile access NE (e.g. H(e)NB) to associate with the network access policy that is passed on by the PF from the mobile network.

Another consideration is that, as discussed above, it is not always possible to predict to which the local PF (e.g. BPCF) in the fixed access network that is assigned to serve the NE. The location information is required by the mobile network PF so that it can identify the BPCF at the fixed access network for it to communicate the policy information for the given NE. One of the solutions to this is to refer to the public IP address of the NE which was managed and assigned by the fixed access network so that the mobile core network can derive the estimated location of the NE.

This matter gets complicated when the fixed network deploys NAT which lies between the mobile access NE (e.g. H(e)NB) resided at the customer's premises and the mobile access PF resided at the NE's core network, and this introduces the requirement to resolve the mapping between the Outer Private-IP and Public-IP so that the NE can resolve the Inner-IP to the Outer Public IP mapping as the NE does not have the knowledge of the Outer Public-IP initially.

This matter also gets complicated when the mobile network deploy IPSec to interconnect the mobile access NE (e.g. H(e)NB) with its mobile access gateway (e.g. H(e)NB-GW), and this introduces the requirement to resolve the mapping between the Inner-IP and the Outer-IP for the mobile network PF to pass on the NE's policy to the fixed access network based on Outer Public-IP due to the fixed access network gateway (e.g. eBNG) cannot identify the required NE as it has no access to the Inner-IP that is encrypted and encapsulated inside the IPSec tunnel.

As a result, the mobile and the fixed networks should both recognize the identifier of the mobile access NE (e.g. H(e)NB) so that the network access policy can be enforced on the NE.

Figure 3:
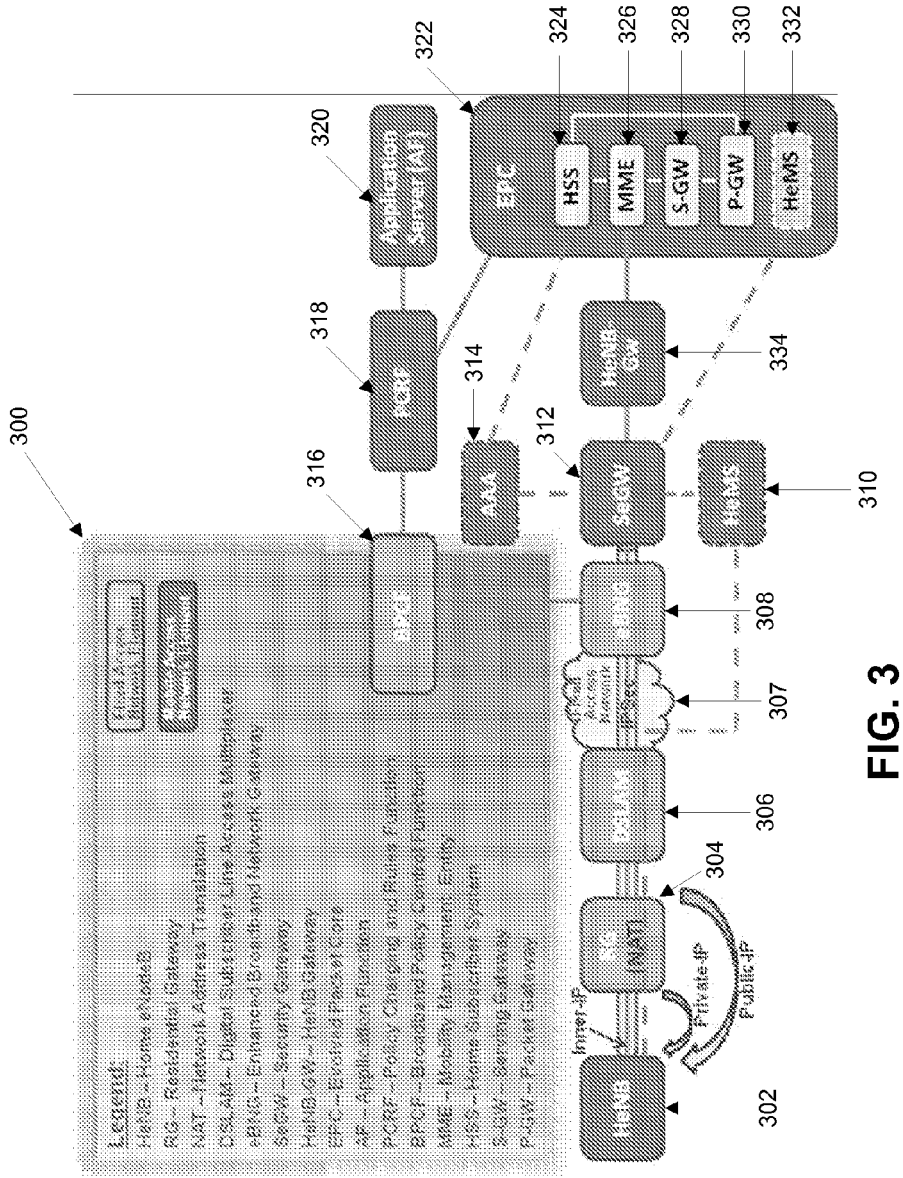
FIG. 3 is a block diagram representation of a fixed mobile convergence (FMC) architecture.

FIG. 3 shows an example of the FMC network architecture to illustrate the interconnection scenario under 3GPP EPC-based H(e)NB Femto architecture. The following abbreviations are used for brevity.

HeNB 302—Home eNodeB
RG 304—Residential Gateway
NAT—Network Address Translation
DSLAM 306—Digital Subscriber Line Access Multiplier
eBNG 308—enhanced Broadband Network Gateway
SeGW 312—Security Gateway
HeNB-GW 334—HeNB Gateway
EPC 322—Evolved Packet Core
AF 320—Application Function
PCRF 318—Policy Charging and Rules Function
BPCF 316—Broadband Policy Control Function
MME 326—Mobility Management Entity
HSS 324—Home Subscriber System
S-GW 328—Serving Gateway
P-GW 330—Packet Gateway
HeMS 310, 332—HeNB Management System/Server
AAA 314—Authentication, Authorization and Accounting Server NOTE-1 Inner-IP, Private Tunnel-IP and NATed Tunnel-IP referred by this invention here-in do not just imply the IP address only; but also include the port number information in the IP header.

FIG. 3 presents an example of the 3GPP EPC-based H(e)NB Femto architecture. This document as described in the following section applies the same design solution to the 3GPP UMTS-based HNB architecture as for the 3GPP EPC-based H(e)NB. In the case of the UMTS-based HNB, the HeNB-GW in all figures will be replaced by HNB-GW and, instead of having the HeNB-GW connecting to MME, the HNB-GW will be connecting to the SGSN (Serving GPRS Support Node) and MSC (Mobile Switching Center) in the Mobile Core 408, as shown in the femto architecture 400 depicted in FIG. 4.

Figure 4:
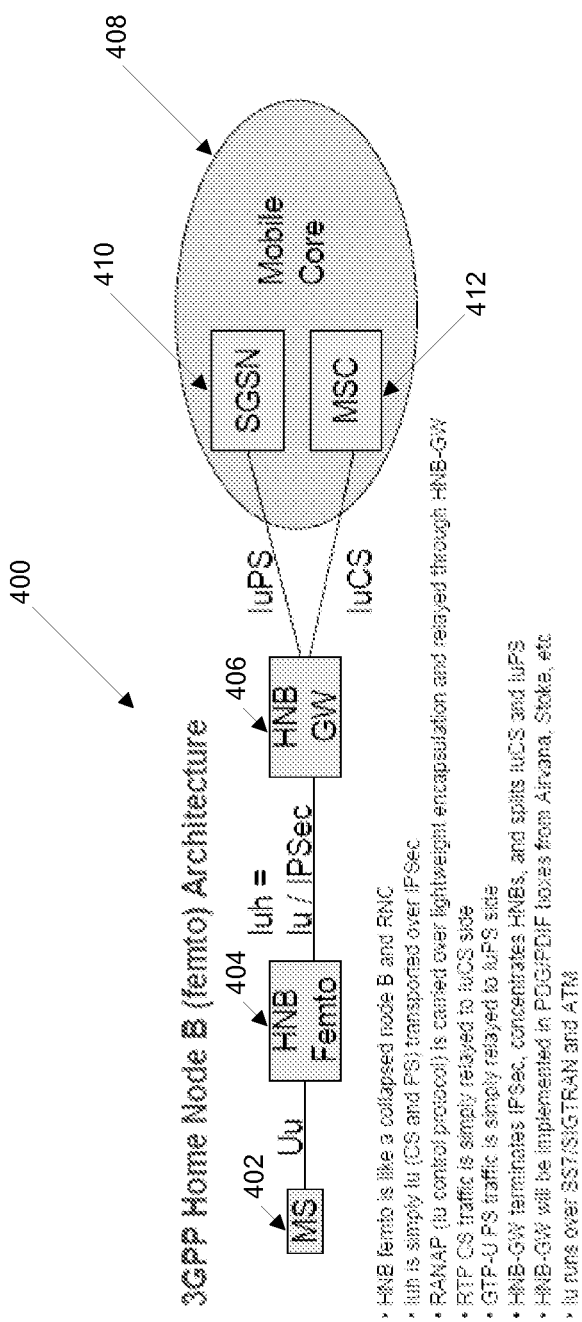
FIG. 4 is a block diagram representation of a portion of an FMC architecture that includes a 3GPP femto home node.

With reference to FIG. 4, the following abbreviations are used for brevity.

MS 402—Mobile Station

HNB Femto 404—femto base station

HNB GW 406—Home eNodeB Gateway

SGSN 410—Serving GPRS Support Node

MSC 412—Mobile Switching Center

Three exemplary methods are provided. Briefly, in a first exemplary method ("Method-A") SeGW initiated reporting of the mapping of the H(e)NB's Inner-IP with the H(e)NB's NATed Tunnel-IP is provided, with the assumptions that, the H(e)NB's Management System entity (H(e)MS) is present in the FMC architecture and there is an interface defined between the SeGW and the H(e)MS.

In a second exemplary method, H(e)NB initiated reporting of the mapping of the H(e)NB's Inner-IP with the H(e)NB's NATed Tunnel-IP of which the H(e)NB obtains the mapping information from the SeGW by leveraging the exchanges of the Configuration Payload and optionally the Vendor-ID Payload during the IKEv2 operation (RFC 5996) between the H(e)NB and SeGW for setting up the IPSec tunnel is provided.

In a third exemplary method ("Method-C") SeGW-initiated reporting of the mapping of the H(e)NB's Inner-IP with the H(e)NB's NATed Tunnel-IP is provided with the assumptions that, the H(e)NB's Serving Gateway (e.g. HNB-GW or HeNB-GW) or HeNB's serving Mobility Management Entity (MME) is present in the FMC architecture and there is an interface defined between the SeGW and the H(e)NB-GW or between the SeGW and the MME.

FIG. 5 is a flow chart representation of a process 500 of providing address resolution mapping, which is described in greater detail below. At 502, the presence of a network address (port) translation table is detected. At 504, when the NAT table is present, a message exchange protocol is implemented to obtain a mapping between a first IP address and a second IP address. As discussed in this document, in some implementations, the first IP address is the Inner-IP address and the second IP address is the NATed Tunnel-IP address. At 506, the mapping between the first IP address and the second IP address is reported in a communication message. For example, in some implementations, the SeGW communicates the mapping. In other implementation, the HeNB communicates the mapping. In some implementations, the mapping is communicated to a server (e.g., a mobility management entity, a policy enforcement server, etc.) operating in the mobile core network.

FIG. 6 is a block diagram representation of a portion of a communication apparatus 600. The NAT detector 602 detects the presence of a NA(P)T table. The encryption key exchanger 604 obtains, when the NA(P)T table is present, a mapping between a first IP address and a second IP address (e.g., the Inner-IP and the NATed Tunnel-IP) using key exchange messages. The mapping reporter 606 reports, in a communication message, the mapping between the first IP address and the second IP address.

Various embodiments and variations are now described in greater detail. In some embodiments, each of the above three method includes IP Address Mapping Resolution solution that is divided into three phases as described below.

Phase-1:

Common Procedures for all Methods

IPSec NAT-Traversal Discovery and Negotiation

Prior to applying any of the three methods as outlined above, in some embodiments, the two IPSec peers (i.e. at the H(e)NB and at the SeGW) first determine whether NA(P)T is present between them (e.g. H(e)NB and SeGW). In some embodiments, the presence of NA(P)T in between, is detected using the IKEv2 NAT_DETECTION_SOURCE_IP Notification as defined by RFC 5996, related to the negotiation of NAT-Traversal in the IKE, to be executed by the two IPSec peers (e.g. H(e)NB and SeGW). The specific mechanism and procedures as described in this RFC 5996 to be used in the following phases are well known in the art. Several other techniques for detecting the presence of NA(P)T are also possible.

Phase-2:

Resolution of Mapping Between the Inner-IP and NATed Tunnel-IP Over NAT/NAPT

In some embodiments, when the presence of NAT/NAPT is discovered between the two IKEv2/IPSec peers, one of the techniques described below can be used to resolve the H(e) NB's Inner-IP and NATed Tunnel-IP mapping.

Figure 7:
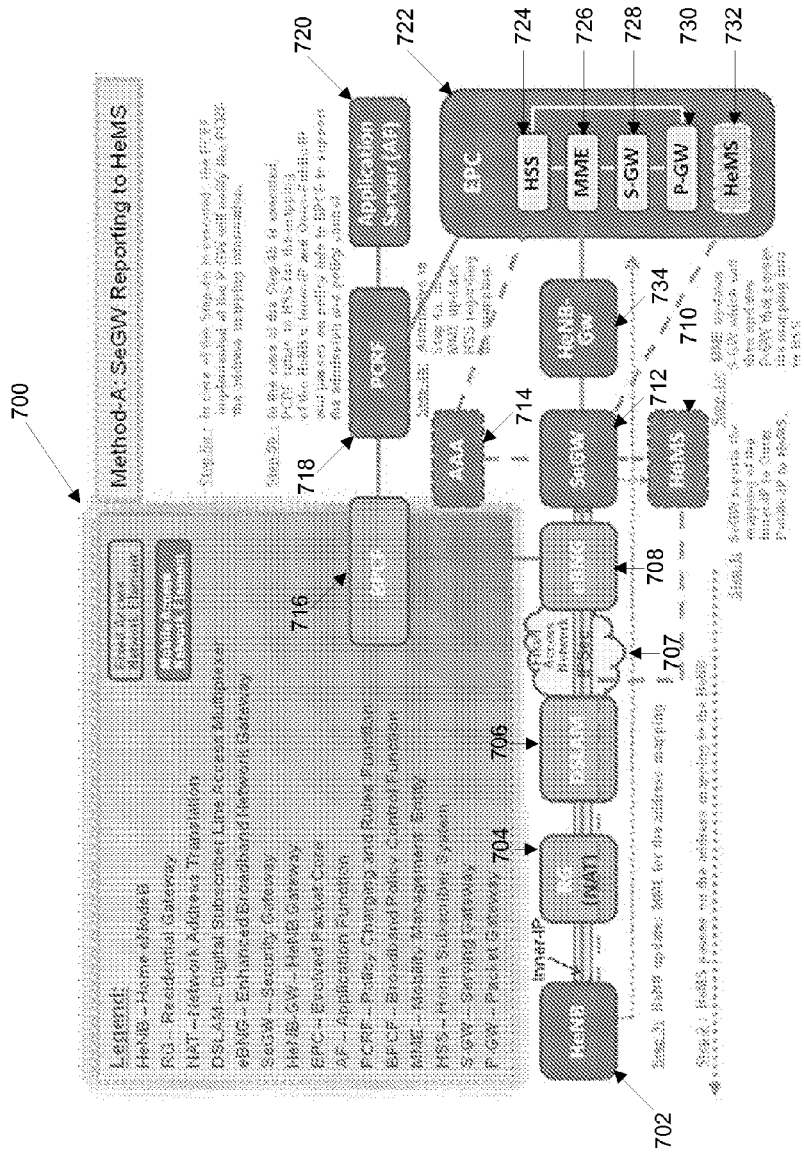
FIG. 7 is a block diagram representation of an FMC architecture.

With reference to FIG. 7, an architectural block diagram depicting SeGW initiated address mapping reporting to the H(e)NB Management System is depicted. In some embodiments, the architectural elements 702, 704, 706, 707, 708, 710, 712, 714, 716, 718, 720, 722, 724, 726, 728, 730, 732 and 734 are similar to the corresponding architectural elements 302, 304, 306, 307, 308, 310, 312, 314, 316, 318, 320, 322, 324, 326, 328, 330, 332 and 334 in FIG. 3.

Method-A assume the interface between the H(e)NB and the H(e)MS is present. In some implementations, after the SeGW 712 authenticates the H(e)NB 702 successfully, the H(e)NB 702 retrieves the H(e)NB's NATed Tunnel-IP (i.e. the source address and source port number) from the UDP encapsulated IKEv2 IP message's header. As SeGW 712 will have the knowledge the of the H(e)NB's Inner-IP during the operation to authenticate the H(e)NB 702 which also involves in installing the H(e)NB's Inner-IP which is assigned by the H(e)NB's mobile core network to the H(e)NB 702. The SeGW 712 will then notify the H(e)MS 710 for the mapping of the H(e)NB's Inner-IP and the NATed Tunnel-IP.

In some implementations, HeMS 710 then notifies the H(e)NB 702 regarding the mapping of the Inner-IP and the NATed Tunnel-IP. Consequently, the HeNB 702 will pass on the mapping information to the MME 726 via the HeGW 734 which will also pass on the mapping information to the PCRF 718 via the path of MME 726 to S-GW 728 followed by P-GW 730 of which the PCEF function within the P-GW 730 will update the PCRF 718.

In some implementations, HeMS 710 (i.e. HeNB's serving Management System), passes on the mapping information to the PCRF 718 via the path of the SGSN and GGSN (Gateway GPRS Support Node), not shown in FIG. 7, of which the PCEF function resided will update the PCRF 718; or via the path of the SGSN to MME 726, and then to S-GW 728 followed by P-GW 730 of which the PCEF function within the P-GW 730 will update the PCRF 718.

Alternatively, the MME 726 could update the HSS 724 regarding the address mapping information which can be retrieved by PCRF 718 for the policy enforcement operation.

The operations described above on how the H(e)NB 702 propagates the mapping information to the PCRF 718 and alternately on how the MME 726 retrieves the mapping information from the SeGW 712 are part of the Phase-3 operations which will be further discussed later in this document.

Figure 8:
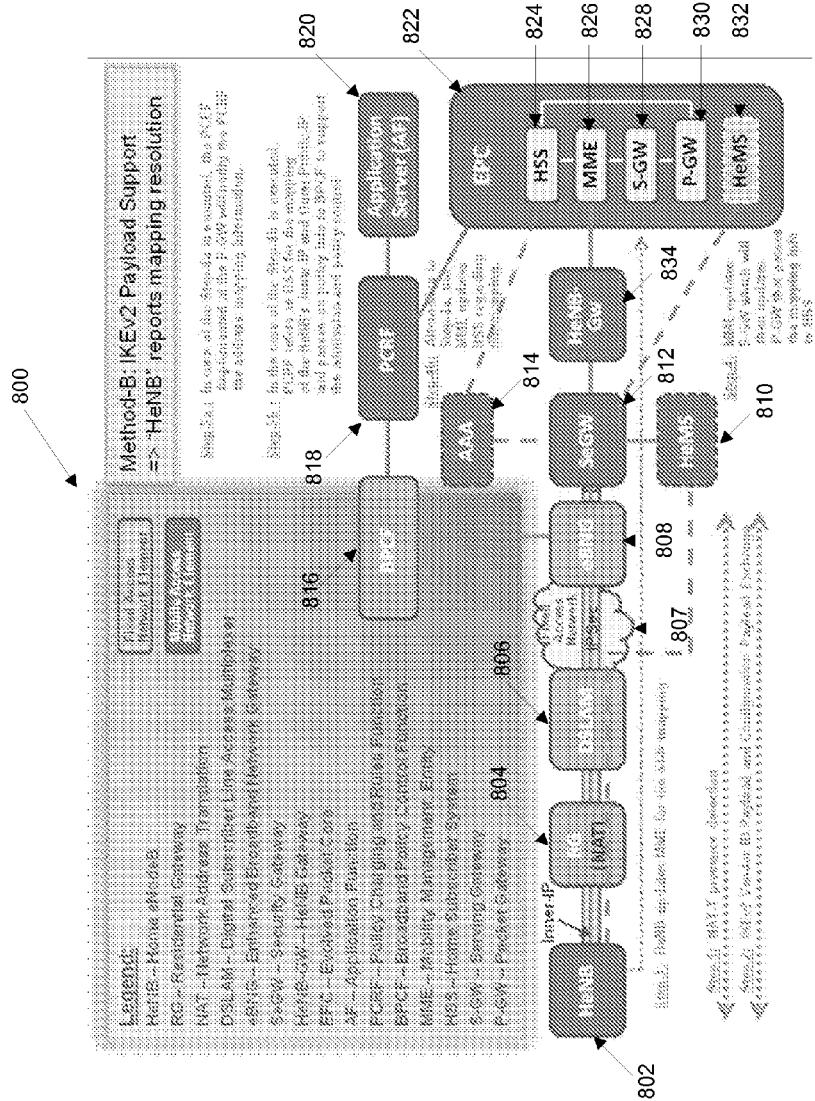
FIG. 8 is a block diagram representation of an FMC architecture.

With reference to FIG. 8, the previously described Method-B of providing IKEv2 payloads support for addresses mapping is discussed in greater detail. In some implementations, the architectural elements 802, 804, 806, 807, 808, 810, 812, 814, 816, 818, 820, 822, 824, 826, 828, 830, 832 and 834 are similar to the corresponding architectural elements 302, 304, 306, 307, 308, 310, 312, 314, 316, 318, 320, 322, 324, 326, 328, 330, 332 and 334 in FIG. 3.

In some implementations, Method-B leverages the two existing IKEv2 payload s, Configuration Payload and optionally together with the Vendor ID Payload, if needed to differentiate further the purpose of the Configuration Payload, as defined by RFC 5996, IKEv2 feature for IPSec Remote Access Client (IRAC), which is originally designed for bootstrapping IKE client's unique Outer Private-IP during the IKE_AUTH exchange in order to derive the CHILD-SAs for the IPSec tunnel. In addition, the RFC 5996 allows the extension of the Configuration Payload to support the IKEv2 peers informational exchange.

In one aspect, Method-B introduces additional Configuration Payload Attributes (i.e. the NATed Tunnel-IP information of the Protected Endpoint) for the Configuration Payload to be included in the IKEv2 Messages communicated between the SeGW 812 to the H(e)NB 802. Since both the H(e)NB 802 and SeGW 812 have the knowledge of its the Inner-IP which is assigned by is mobile core network, once the mapping is derived for the Private Tunnel-IP and the NATed Tunnel-IP, the H(e)NB 802 can derive the mapping of all three IPs. More specifically, not only the IP addresses are exchanged, the associated IP port number can also be included in the information exchange.

In some implementations, once the H(e)NB 802 derives the mapping, the H(e)NB 802 updates the mapping to their core network the same way as described in Method-A.

Figure 9:
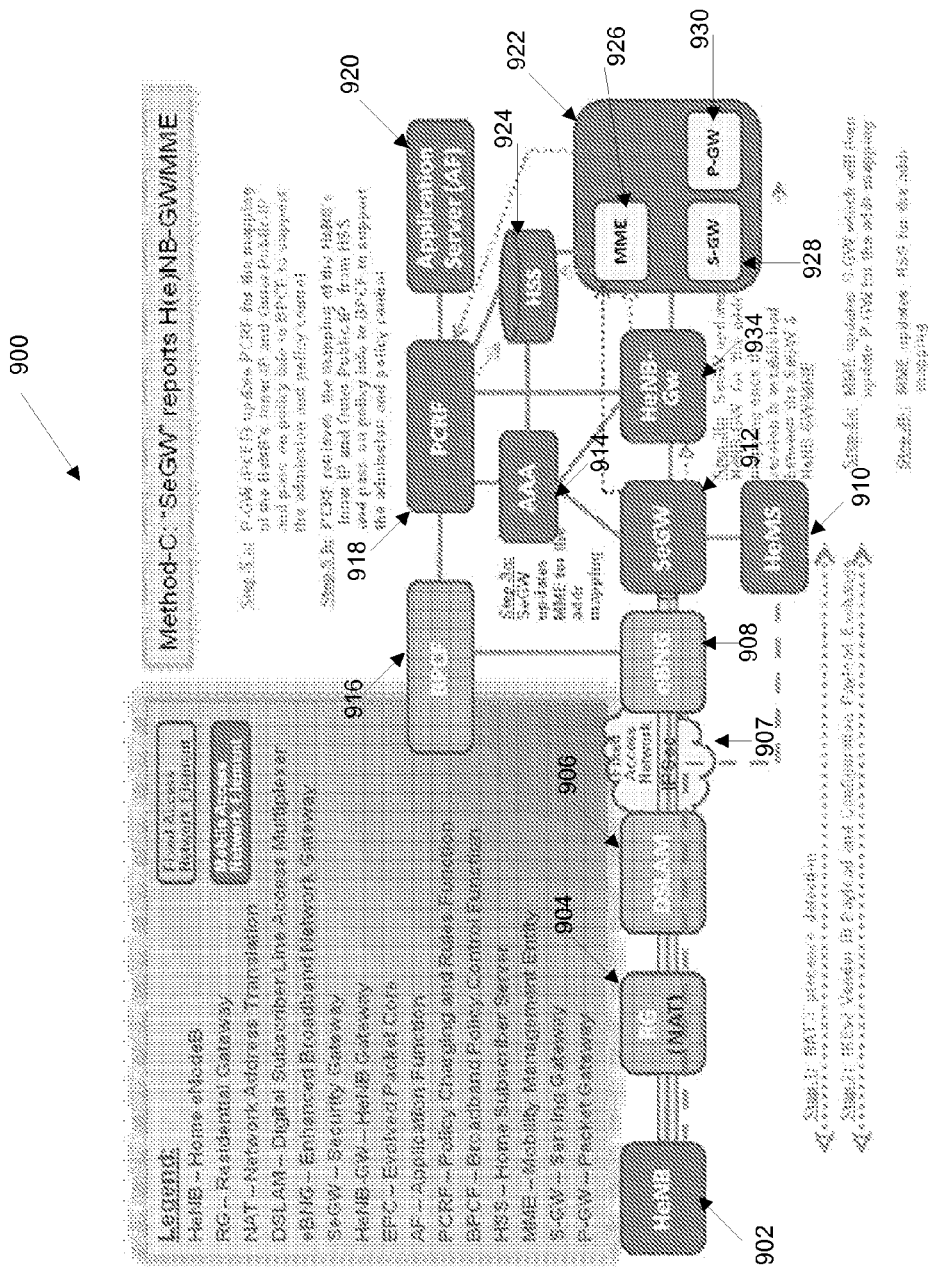
FIG. 9 is a block diagram representation of a portion of an FMC architecture.

With reference to FIG. 9, Method-C, in which SeGW 912 is in direct communication with H(e)NB's serving Gateway (e.g. HNB-GW or HeNB-GW 934) or HeNB's serving Mobility Management Entity (e.g. MME 926) for the Inner-IP and the NATed Tunnel-IP Mapping is discussed. In some implementations, the architectural elements 900, 902, 904, 906, 907, 908, 910, 912, 914, 916, 918, 920, 922, 924, 926, 928, 930 and 934 are similar to the corresponding architectural elements 300, 302, 304, 306, 307, 308, 310, 312, 314, 316, 318, 320, 322, 324, 326, 328, 330 and 334 in FIG. 3

As previously mentioned, Method-C assumes the interface is present between the SeGW 912 and H(e)NB's serving Gateway (e.g. HNB-GW or HeNB-GW 934) or between the SeGW 912 and the HeNB's serving Mobility Management Entity (e.g. MME 926). After the SeGW 912 authenticates the H(e)NB successfully, the SeGW 912 will maintain the H(e)NB's NATed Tunnel-IP info (i.e. the source address and source port number) obtained from the UDP encapsulated IKEv2 IP message's header. As SeGW 912 will have the knowledge the of the H(e)NB's Inner-IP during the operation to authenticate the H(e)NB which also involves in installing the H(e)NB's Inner-IP assigned by the H(e)NB's mobile core network (e.g. Evolved Packet Core—EPC 922) to the H(e)NB 902.

As further discussed next, there are several possible ways in Method-C for the SeGW 912 to pass on the address mapping info to the H(e)NB-GW 934 or to the MME 926 for the NATed Tunnel-IP.

Phase-3:

Procedures for Address Mapping Reporting

In some implementations, the address mapping reporting may be performed differently for the above-discussed Method-A, Method-B and Method-C.

Address Mapping Reporting via Method-A:

In some configurations, in Method-A, the address mapping reporting is initiated by the SeGW towards the H(e)NB via to the H(e)NB's serving Management System (HeMS).

The H(e)MS then passes on the mapping information to the H(e)NB. The rest of the control flows for propagating the mapping information are the same as the H(e)NB initiated reporting as described in Method-B below.

Address Mapping Reporting via Method-B:

In some configurations, H(e)NB initiates the address mapping reporting. The H(e)NB reports the mapping to its management entity (e.g. 3GPP Mobility Management Entity (MME). The MME then either passes on the information to the serving S-GW that, in turn will forward the information to the PCEF function at the P-GW. Consequently, the mapping information will be forwarded to the PCRF.

Alternatively, the MME can update the Home network subscriber database (e.g. 3GPP Home Subscriber Server (HSS)) that the corresponding serving policy function (PF) has the access to.

Once the H(e)NB has the knowledge of its NATed Tunnel-IP, the H(e)NB passes on such address mapping information to other associated NE that may also require such information.

In various implementations, two approaches may be used for how the H(e)NB-GW is to receive the address mapping information:

Approach#1: H(e)NB reports the address mapping information to the H(e)NB-GW during the H(e)NB registration with the H(e)NB-GW.

Approach#2: H(e)NB reports the address mapping information to the H(e)NB-GW during the User Equipment/Terminal (i.e. UE) attachment to the H(e)NB.

For Approach#1, after the H(e)NB is successful authenticated by the SeGW, the H(e)NB then registers with the serving H(e)NB-GW as the subsequent H(e)NB attachment procedure to the network. When the H(e)NB registers with the serving H(e)NB-GW, the H(e)NB also includes the address mapping information to the H(e)NB-GW.

For Approach#2, once the H(e)NB completes its initialization, it will become operational to serve a communication device such as a user equipment (UE). When the UE discovers the operational H(e)NB, it will then initiate the UE attachment procedure towards the H(e)NB. H(e)NB uses this as the trigger to pass on the address mapping information to the serving H(e)NB-GW as the UE is also required to attach to the serving H(e)NB-GW as part of the UE attachment procedure.

Address Mapping Reporting via Method-C:

There are two options for the Method-C for the SeGW to provide the address mapping info to the H(e)NB-GW and to the MME.

Option-A:

After the successful authentication of the H(e)NB with the SeGW, the H(e)NB will then perform the registration with the H(e)NB-GW or with the MME (in case the HeNB GW is not deployed). Such H(e)NB registration will become the trigger for the H(e)NB-GW as well as for the MME to establish the session with the SeGW. Since the H(e)NB-GW and the MME recognizes the H(e)NB's inner-IP, they can refer H(e)NB's inner-IP to identify the serving Se-GW of the H(e)NB and to trigger a new session establishment with the H(e)NB.

It will be appreciated that, in the case of the HeNB, the HeNB-GW is an optional entity. Hence, when HeNB-GW is not present, the newly established session is between SeGW and MME.

Option-B:

During the UE attachment to the H(e)NB, the H(e)NB-GW or the MME will trigger the session establishment with the Se-GW, if the session has not been established earlier triggered by other UE's attachment. The H(e)NB-GW and the MME can refer to the H(e)NB's inner-IP which is provided during the UE attachment to identify the serving SeGW of the H(e)NB and to trigger a new session establishment with the SeGW.

During the session establishment triggered by H(e)NB-GW/MME towards the SeGW, the SeGW will pass on the mapping of the H(e)NB's Inner-IP and the NATed Tunnel-IP to H(e)NB-GW/MME.

Consequently, the H(e)NB GW/MME will also pass the mapping information to the PCRF via the path of S-GW followed by P-GW of which the PCEF function resided at the P-GW will update the PCRF.

In the case of a 3G network where the MME is not present, the HNB-GW passes on the mapping to SGSN (Serving GPRS Support Node) which will then pass on the mapping information to the PCRF via the path of the GGSN (Gateway GPRS Support Node) of which the PCEF function is resided will update the PCRF.

Alternatively, in the case when the MME or the SGSN has the direct interface with the HSS, MME or SGSN could update the HSS regarding the address mapping information which can be retrieved by PCRF later on during the policy enforcement operation.

Figure 10:
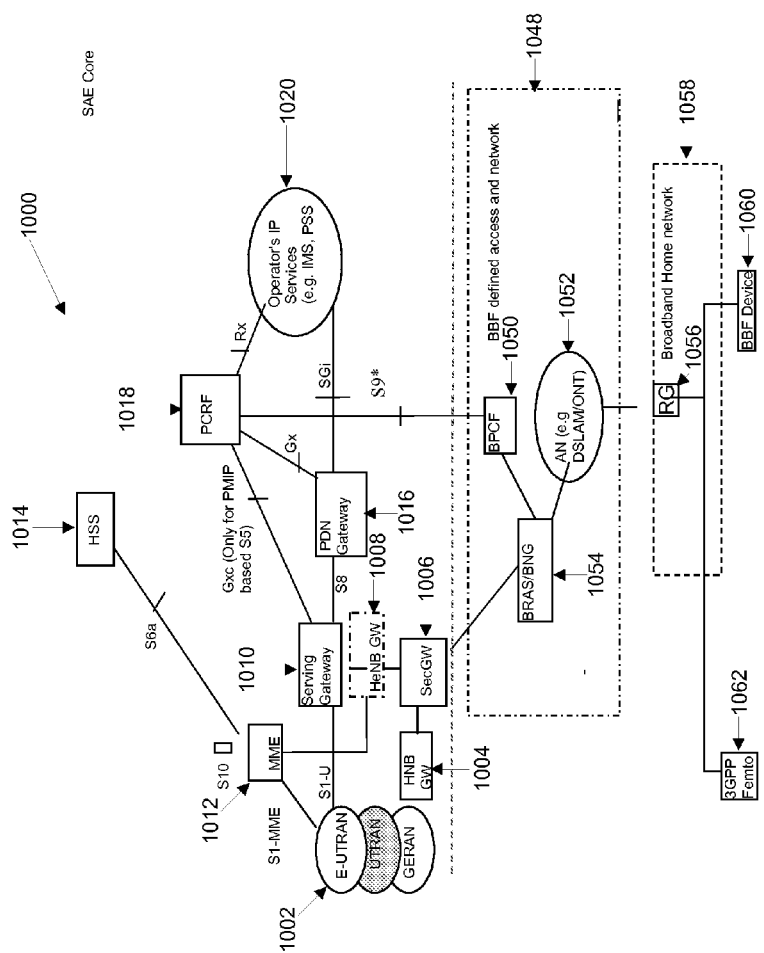
FIG. 10 is a block diagram representation of an FMC network comprising a 3GPP wireless network and a broadband home network.

With reference to FIG. 10, a particular deployment architecture 1000 in a 3GPP network is now discussed in greater detail. The PCRF (Policy Charging and Rules Function) is the PCRF 1008 of the mobile core network. The PCRF 1008 will interwork with the BPCF 1050 (Broadband Policy Control Function) which is the PF of the fixed access network defined by, e.g., Broadband Forum (BBF) SDO for the policy and charging control interworking on the 3GPP Femto 1062 over the S9* reference point.

As a result, the PCRF 1008 is required to identify the mapping between the H(e)NB's Inner-IP and the NATed Tunnel-IP so that it can pass-on the required additional fixed broadband network resource and policy for H(e)NB's attached user device to the BPCF 1050.

By referring to this FMC architecture 1000, the following explains how this invention resolves the mapping between the H(e)NB's Inner-IP, Private Tunnel-IP and the NATed Tunnel-IP when applying Method-A and Method-B.

At this point, the H(e)NB Inner-IP and the NATed Tunnel-IP will be aware by both the H(e)NB 1062 and the SeGW 1006.

Phase-1:
Common Procedures for all Methods
IPSec NAT-Traversal Discovery and Negotiation Initially, the SeGW and 3GPP Femto (i.e. HNB or HeNB) first determine whether NA(P)T is enabled between themselves. To determine the presence of NA(P)T in between, this invention leverages the IKEv2 NAT_DETECTION_SOURCE_IP notification as defined by RFC 5996 to support the NAT-Traversal discovery to be executed by the two IKEv2/IPSec peers (e.g. H(e)NB and SeGW).

Phase-2:
Resolution of Mapping Between the Inner-IP and Outer-IP Over NAT

Once the presence of NAT/NAPT is discovered between the two IKEv2/IPSec peers (i.e. H(e)NB and SeGW), one of the three methods discussed above and further described below can be used to resolve the H(e)NB's Inner-IP and NATed Tunnel-IP mapping.

Method-A—SeGW Notifies H(e)MS of the Inner-IP and the NATed Tunnel-IP Mapping. In some implementations, Method-A is implemented similar to the description provided above with respect to FIG. 7.

Method-B—IKEv2 Payloads Support for Addresses Mapping

In some implementation, the 3GPP Femto (i.e. H(e)NB) may bootstrap the NATed Tunnel-IP as follows:

H(e)NB would have prior coordination (e.g. via configuration) with its serving SeGW regarding the Vendor ID. H(e)NB includes the Vendor ID in the Vendor ID Payload in the IKEv2 Message-3 in order to validate the identity of the two IKEv2 peers. In the same IKEv2 Message-3 Configuration Payload, the H(e)NB will include the CFG_REQUEST to request its NATed Tunnel-IP to be returned by the SeGW. The SeGW processes the IKEv2 Message-3 to verify the Vendor ID which is legitimate. The SeGW will then include the H(e)NB NATed Tunnel-IP including the port# that were received over the IKEv2 Message's IP header coming from the H(e)NB and modified by the intermediate NAT, in the CFG_REPLY which will include the Configuration Payload in the IKEv2 Message-4. The H(e)NB receives the IKEv2 Message-4 and extracts is NATed Tunnel-IP including the port number.

Method-C—In Method-C implemented with reference to network 1000, SeGW is in direct communication with H(e)NB's serving Gateway (e.g. HNB-GW or HeNB-GW) or HeNB's serving Mobility Management Entity (e.g. MME) for the Inner-IP and the NATed Tunnel-IP Mapping Method-C assumes the interface is present between the SeGW and H(e)NB's serving Gateway (e.g. HNB-GW or HeNB-GW) or between the SeGW and the HeNB's serving Mobility Management Entity (e.g. MME). As soon as the SeGW authenticates the H(e)NB successfully, the SeGW will maintain the H(e)NB's NATed Tunnel-IP info (i.e. the source address and source port number) obtained from the UDP encapsulated IKEv2 IP message's header. As SeGW will have the knowledge the of the H(e)NB's Inner-IP during the operation to authenticate the H(e)NB which also involves in installing the H(e)NB's Inner-IP assigned by the H(e)NB's mobile core network (e.g. Evolved Packet Core—EPC) to the H(e)NB.

Phase-3 in network 1000:
Procedures for Address Mapping Reporting

In Method-A, the address mapping reporting is initiated by the SeGW towards the H(e)NB whereas in Method-B, the H(e)NB is the one who initiates the reporting.

In the case of SeGW initiated reporting, SeGW reports the mapping to the serving H(e)NB Management System (HeMS) which will then pass on the mapping information to the H(e)NB. The rest of the controls for propagating the mapping information are the same as the H(e)NB initiated reporting as described in Method-B.

In the case of H(e)NB initiated reporting, H(e)NB reports the mapping to its management entity (e.g. 3GPP Mobility Management Entity (MME)). The MME will then either pass on the information to the serving S-GW that, in turn will forward the information to the PCEF function at the P-GW. Consequently, the mapping information will be forwarded to the PCRF. This particular control flow is consistent with the existing control that has been defined in the standard, except that, additional address mapping information will be added to the interfaces across those affected entities.

Alternatively, the MME can update the Home network subscriber database (e.g. 3GPP Home Subscriber Server (HSS)) that the corresponding serving PF will have the access to.

Once the H(e)NB has the knowledge of its H(e)NB's NATed Tunnel-IP, it is reasonable for the H(e)NB to pass on such address mapping information to other associated NE that may also require such information.

There are two approaches for how the H(e)NB-GW to receive the address mapping information. These approaches have been discussed previously.

In Method-C, as previously discussed, there are two options (Option-A and Option-B) for the SeGW to provide the address mapping info to the H(e)NB-GW and to the MME which will then eventually be available to the PCRF. In Option-B, during the H(e)NB registration or during the UE attachment to the H(e)NB, the H(e)NB-GW or the MME will trigger session establishment with the Se-GW, if the session has not been established earlier triggered by other UE's attachment. The H(e)NB-GW and the MME can refer to the H(e)NB's inner-IP provided by the UE's attachment to identify the serving SeGW of the H(e)NB and to trigger a new session establishment with the SeGW.

Another example embodiment of a femtocell configuration is now discussed in greater detail.

Figure 11:
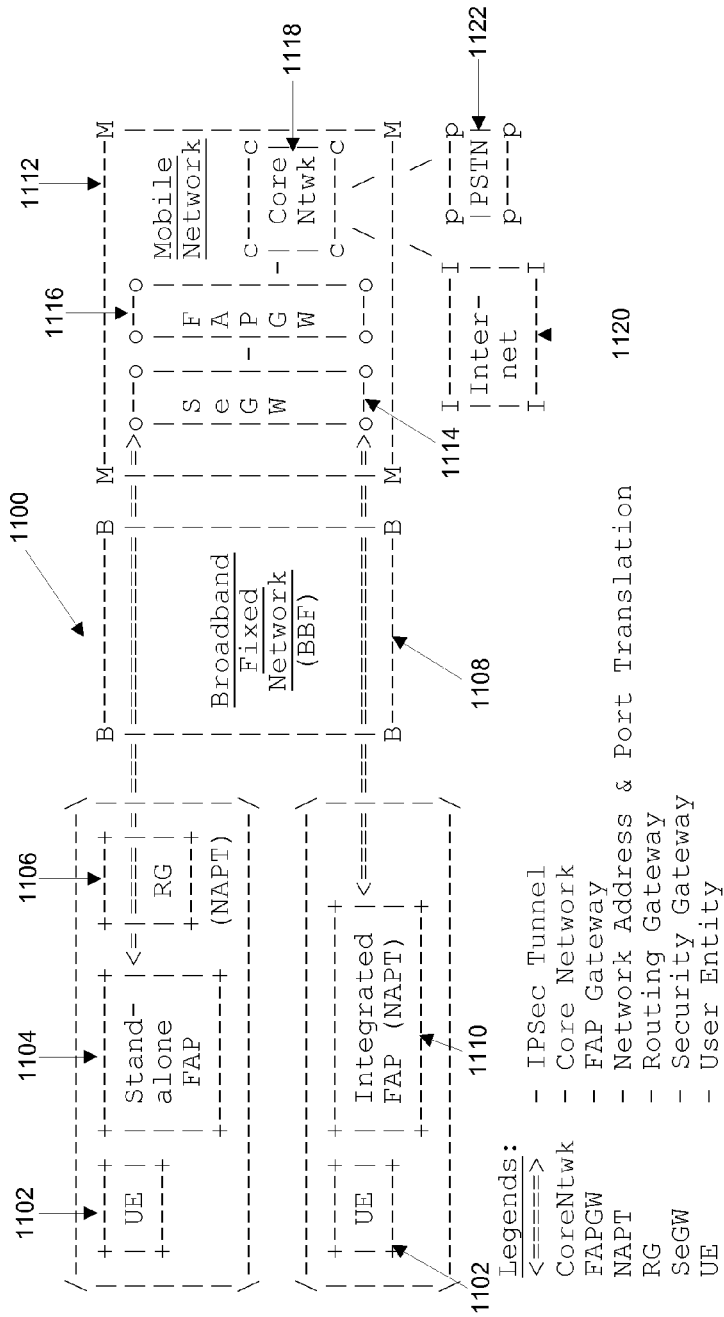
FIG. 11 illustrates a typical femtocell network architecture.

With reference to FIG. 11, a typical Femtocell network configuration 1100 is described. The Femtocell Access Point (FAP) is typically designed to support plug and play. However, given it is operating on the license band frequency spectrum to support the mobile devices, the FAP typically supports location verification to ensure its legitimacy to operate on the license spectrum for a given mobile operator prior to the FAP be ready to serve its mobile devices. As depicted in FIG. 11, a user equipment (UE) 1102 is communicatively coupled to the FAP 1104, which in turn is in communication with the Residential Gateway (RG) 1106. In some configurations, UE 1102 may be communicating with an integrated FAP 1110 that includes both the RG and FAP functionalities (including NAPT). The RG 1106 is in communication with a mobile network 1112, including network entities such as SeGW 1114, FAP-GW 1116, and other core network 1118, which is in turn communicatively coupled to the internet 1120 and public switched telephony network (PSTN) 1122.

There are several recommendations from today's mobile standards that provide possible solutions, but all with limitations:

(1) A GPS based solution is limited in that it may not be feasible due to poor indoor signal (2) An Overlay Macro cell solution may be limited in the sense that it is not always feasible, especially in rural area (3) A location based on Femto-AP's IP address may be limited due to private IPv4 addressing and NA(P)T.

Location Option 1. and 2. above are very much limited by the physical environment where the FAP is installed which may be beyond the control of the mobile operator; whereas, Option 3. could be resolved by operators' deployment strategy and network solution on the private IPv4 addressing and the NAPT issue. Hence, Location Option 3. is considered as the more desirable option to address this FAP location verification requirement.

Once the location of the FAP is identified (e.g. based on IP address), the corresponding BBF access network which assigns the public IPv4 address to the given FAP can also be known to the mobile network, and hence, the location of the FAP could be verified.

FAP's identification for the attached mobile UE

As part of the FMC interworking, the policy associated with the mobile UE is provided by the policy function of the mobile network, which serves the UE, to the policy function of the BBF network that serves the same UE. In the case of the private IPv4 addressing plan is employed at the BBF network, the identity of its mobile UE and the corresponding mapping between the private IPv4 address and the public IPv4 address of the FAP with the port number (in the case of the NAPT) are known by the policy function of the mobile network so that it can inform the appropriate policy function of the BBF network based on the BBF local identification of the FAP that the mobile UE is attached. As a result, the BBF network can provide the policy enforcement to apply the QoS policy on the FAP's traffic originated by and targeted to the UE.

Figure 12:
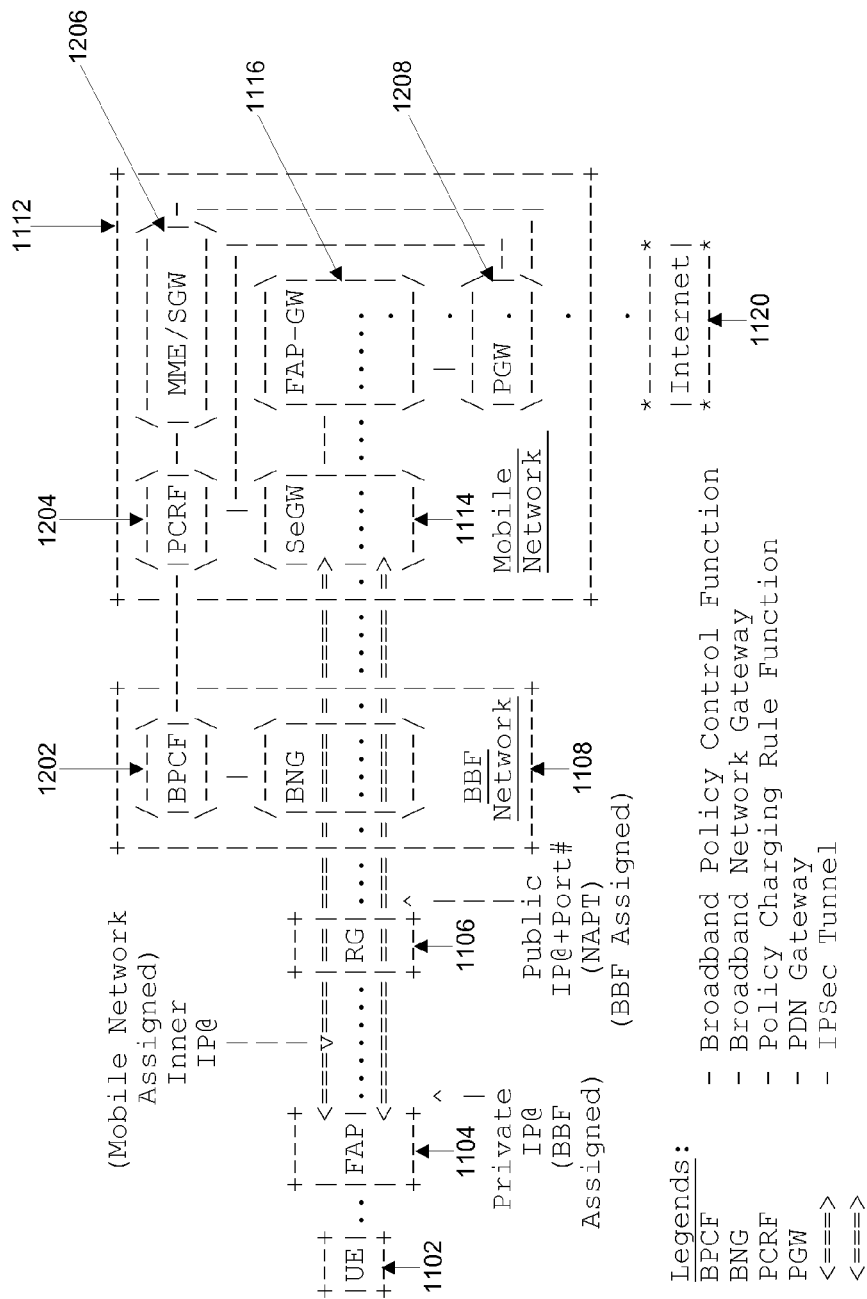
FIG. 12 illustrates another femtocell network architecture.

FIG. 12 describes the scenario of the mobile UE's IPv4 address-mapping relationship in typical Femtocell deployment over the BBF and mobile networks with IPSec tunneling. In FIG. 12, network entities such as BPCF 1202, which is a part of the BBF network 1108, PCRF 1204, which is a part of the mobile network 1112, MME/S-GW 1206 and P-GW 1208 are explicitly shown.

As shown in the FIG. 12, the mobile network 1112 identifies the UE 1102 based on the inner-IPv4 address that it assigned to the UE 1102. When the UE 1102 attaches to the FAP 1104, all UE's traffic is encapsulated into FAP's IPSec tunnel. The outer-IPv4 address of the FAP's IPSec tunnel is assigned by the BBF network and the IPSec tunnel is terminated at the FAP 1104 and at the SeGW 1114.

If NA(P)T is deployed at the RG, the IPSec tunnel will be encapsulated by the UDP header in the case of the Tunnel-Mode as specified in RFC 5996 [RFC5996] operation is applied, the private outer-IPv4 address of the FAP's UDP encapsulated IPSec tunnel will be replaced by a public outer-IPv4 address with a possible new port number which are assigned by BBF's NA(P)T.

The BPCF/BNG will be based on the public outer-IPv4 address and the port number of the UDP encapsulated IPSec tunnel, to perform the admission control and policy enforcement on the FAP's traffic which is also the UEs' traffic.

Based on the discussions in the previous section, for the FMC interworking deployment with FAP that involves two different operators (i.e. fixed and mobile operators), using private IPv4 addressing with NA(P)T enabled in BBF network, one can recognize the important requirement for the BBF and the mobile networks to determine the IPv4 address mapping as described in the followings:

First, determine the UE attached FAP's public IPv4 address together with the translated port number of the UDP header of the encapsulated IPSec tunnel between the FAP and the SeGW which are assigned by the BBF. The FAP's public IPv4 address is used for identifying the location of the FAP and/or used for identifying the UE's traffic at the BBF network Next, determine the corresponding FAP's public IPv4 address's association with the UE's inner-IPv4 address which is assigned by the mobile network. The association is used for identifying the mobile UE that is attached to the FAP in order to allow the PCRF to retrieve the UE's policy to be passed onto the BPCF at the BBF network Next, based on the typical FAP architecture as described in FIG. 11 above, the only network element that would have the full knowledge of such mapping is the SeGW.

Unfortunately, in today generic FAP architecture, SeGW has no direct or indirect interface to the mobile network's policy function or management function in order to pass on its knowledge of the mapping. One of the main reasons is because SeGW is not specific designed for FAP deployment and hence, there is no justification to define specific interface to the mobile network's policy function or management function.

Given the existing deployment for FAP for mobile operator, it may be too late to change the existing architecture which will introduce backward incompatibility.

Another solution consideration which is based on existing RFC 5389 [RFC5389]—Session Traversal Utilities for NAT (STUN) cane be used to resolve this issue.

Considerations of STUN support for FMC interworking with FAP

RFC 5389 [RFC5389] STUN client/server solution may not suitable for FMC interworking deployment with FAP because of the following reasons.

Assuming the STUN client is implemented at the FAP, there are two options for the STUN server to be deployed and implemented:

Option-1: STUN server is deployed by the BBF operator at the egress of the BNG towards the SeGW based on the generic FAP architecture.

There are two main technical issues that need to be overcome with this option:

Since FAP is a plug and play device, and FAP is not managed by the BBF operator, an additional solution is required to the existing RFCs to determine how to support inter-operator STUN client server discovery.

The security authentication between the STUN client and server according to RFC 5389 [RFC5389] is based on either long-term credential or short-term credential mechanisms. The mechanism requires either a prior pre-configuration or out-of-band signaling which would be extremely difficult to implement when the two network elements are managed by different operators.

Option-2: STUN server is deployed by the mobile operator

There are two further sub-options considered by this Option-2.

Integrate the STUN server into the SeGW—this option requires the STUN server to share the same data path and socket within the IPSec and IKE processing which is a significant change to many existing SeGW implementation, backward compatibility is a major issue.

Deploy STUN server as the standalone element at the ingress of the SeGW—this option requires architecture and procedure changes to the existing FAP related specification which is also another major backward incompatibility issue to the existing architecture.

Considering the above, in some implementations, extension to IKEv2 Configuration Payload may be used.

This solution requires only minimum changes to the existing RFC 5996 [RFC5996]—Internet Key Exchange Protocol Version 2 (IKEv2), and it does not introduce any backward incompatibility issue to the existing RFC, the existing specification, the existing architecture and the existing implementations.

The disclosed technique can be used to leverage the existing IKE Configuration Payload (CP) that has been supported by many FAP deployments to allow the IKE-responder (i.e. SeGW) to insert the UDP encapsulated source-IPv4 address and UDP port number of the UDP encapsulated IPSec tunnel into the CP, once the IKE-initiator (i.e. FAP) and the IKE-responder (i.e. SeGW) are successfully mutually authenticated.

The disclosed techniques are implementable as simple extension to the existing IKEv2 RFC 5996 [RFC5996]; only a new code point is required to be defined for the CP to indicate the carriage of the source IPv4 address and port number in the UDP header of the IPSec tunnel. The disclosed techniques are fully compatibility to the existing architecture and procedures. In some implementations, FAP (i.e. IKE-initiator) has signaling path with the policy function, the management function as well as with the network gateway of the mobile network (e.g. PDN Gateway). In some implementations, CP is part of the IKEv2 parameters which is generally supported by existing FAP-SeGW IPSec/IKEv2 authentication procedures. Each CP is designed to be standalone and orthogonal to each other, and hence, no concern for backward incompatibility to the existing IKEv2 procedures that are supported by the FAP. Built-in dynamic update with the existing FAP authentication procedure to adapt to the changes of the IPv4 address.

In some implementations, each IPv4 address, even for the network translated IPv4 address typically has a limited life-span. When the life-span expires for the given IPv4 address, the IPSec/IKEv2 authentication will be renewed and the subsequent procedures on how to populate the update IPv4 to other impacted network entities can be reused. It will be appreciated that the disclosed techniques create no impact to the existing security mechanisms for the end-to-end system and the existing protocols. The new added code point has no impact to the IKEv2 Configuration Payload to continue the use of the existing IKEv2 security mechanism.

Figure 13:
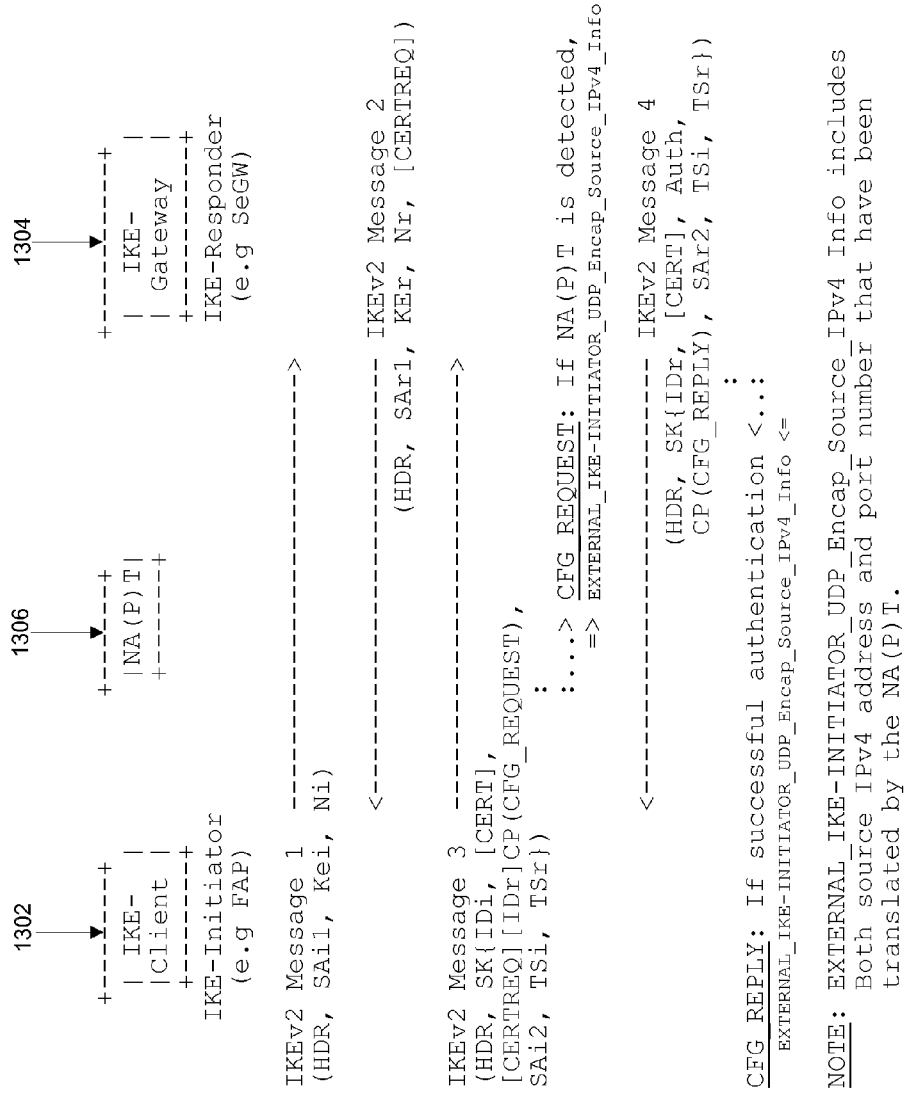
FIG. 13 illustrates messages exchanged between an internet key exchange (IKE) initiator and an IKE responder.

FIG. 13 describes the high-level control flows on how the IKEv2 CP is used to carry the public IPv4 address of the UDP header for encapsulated the IPSec Tunnel. New code point and the corresponding descriptions to be added to RFC 5996 [RFC5996], are as follows:

TABLE 1

Message Field Type Length Value

| Attribute Type Length | Value | Multi-Valued |
|---|---|---|
| INTERNAL_IP4_ADDRESS 0 or 4 octets | 1 | YES |
| INTERNAL_IP4_NETMASK 0 or 4 octets | 2 | NO |
| INTERNAL_IP4_DNS 0 or 4 octets | 3 | YES |
| INTERNAL_IP4_NBNS 0 or 4 octets | 4 | YES |
| INTERNAL_IP4_DHCP 0 or 4 octets | 6 | YES |
| APPLICATION_VERSION 0 or more | 7 | NO |
| INTERNAL_IP6_ADDRESS 0 or 17 octets | 8 | YES* |
| INTERNAL_IP6_DNS 0 or 16 octets | 10 | YES |
| INTERNAL_IP6_DHCP 0 or 16 octets | 12 | YES |
| INTERNAL_IP4_SUBNET 0 or 8 octets | 13 | YES |
| SUPPORTED_ATTRIBUTES Multiple of 2 | 14 | NO |
| INTERNAL_IP6_SUBNET 17 octets | 15 | YES |
| EXTERNAL IKE-INITIATOR UDP Encap_Source_IPv4_Info 0 or 6 octets | 16 | NO |

A new attribute field, EXTERNAL_IKE_INITIATOR_UDP_Encap_Source_IPv4_Info is included. The external source IPv4 address and port number of the UDP encapsulated packet sent by the initiator is requested by initiator in CFG_REQUEST once the IKE peers detect the presence of NAT between them. If both the initiator 1302 and responder 1304 are mutually authenticated, the initiator's source IP address and port number of the UDP encapsulated packet will be retrieved by responder and to be included in CFG_REPLY. This attribute is made up of two fields: the first being an IPv4 address and the second being a IPv4 port number. The responder MAY respond with zero or one attribute to initiator.

Configuration Payloads for EXTERNAL_IKE_INITIATOR_UDP_Encap_Source_IPv4_Info

The Configuration payloads is used by the IKE initiator to request its corresponding IKE responder via the CFG_REQUEST to return its NAT source IPv4 information which is composed of the IPv4 address and IPv4 port number via the CFG_REPLY.

The IKE initiator will request such information from its corresponding IKE responder if the presence of NAT 1306 is detected via the NAT traversal procedures in between itself and its corresponding responder.

If the initiator and the responder are mutually authenticated, the responder will respond to initiator for the initiator's NAT source IPv4 address and source port number information.

A minimal exchange might look like this:
CP(CFG_REQUEST)=EXTERNAL_IKE_INITIATOR_UDP_Encap_Source_IPv4_Info( )
CP(CFG_REPLY)=EXTERNAL_IKE_INITIATOR_UDP_Encap_Source_IPv4_Info (198.51.100.234, 233)

Figure 14:
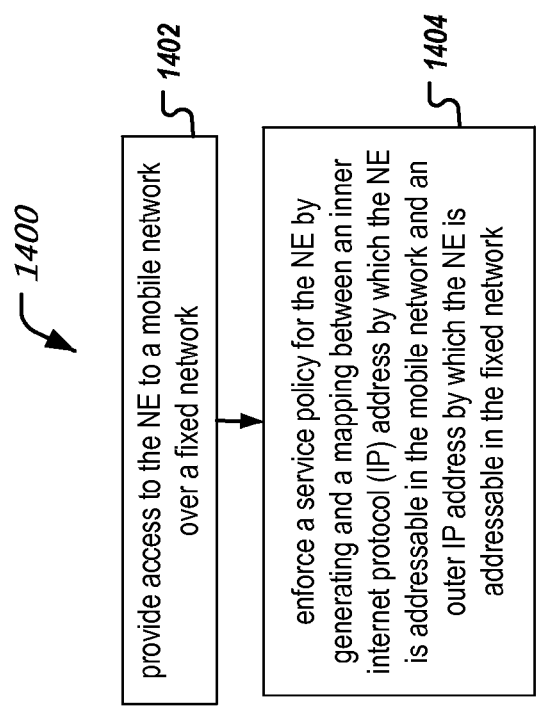
FIG. 14 is a flow chart representation of a process for facilitating wireless communications.

FIG. 14 is a flow chart representation of a method 1400 of operating a network equipment (NE). At 1402, access is provided to the NE to a mobile network over a fixed network. For example, in the FMC architecture disclosed above, access may be provided to a UE, via a residential DSL network, to services in the 3G network in which the UE can operate. At 1404, a service policy is enforced for the NE by generating and mapping between an inner IP address by which the NE is addressable in the mobile network and an outer IP address (e.g., NATed Tunnel IP) by which the NE is addressable in the fixed network.

It will be appreciated that various techniques are disclosed that are useful, in one aspect, to resolve the mapping of the H(e)NB's Private Tunnel-IP with the H(e)NB NATed Tunnel-IP, and the need for the PCRF to learn about the location of the H(e)NB based on the H(e)NB's NATed Tunnel-IP address which is assigned by local fixed broadband access network are the motivation of this invention to support the Fixed Mobile Convergence (FMC) initiatives in multi-operator environment.

It will also be appreciated that when IKEv2/IPSec Tunnel-Mode is operating between the H(e)NB and the SeGW with the UDP Encapsulation enabled to carry the user traffic once the NAT/NAPT is detected, the SeGW will have the knowledge of the mapping between the H(e)NB's Inner-IP and the H(e)NB's NATed Tunnel-IP once the tunnel is established. In such a case, the H(e)NB will have the knowledge of the H(e)NB's Inner-IP and H(e)NB's Private Tunnel-IP in the beginning until this invention is executed to resolve the mapping between the H(e)NB's Private Tunnel-IP and H(e)NB's NATed Tunnel-IP. The H(e)NB can then pass on the NATed Tunnel-IP directly or indirectly to its attached user's PCRF.

It will further be appreciated that, alternatively, the SeGW may pass on the mapping of H(e)NB's Inner-IP with the H(e)NB's NATed Tunnel-IP to H(e)NB's serving gateway (e.g. HNB-GW or HeNB-GW) or HeNB's Mobility Management Entity (MME)

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of facilitating operation of a communication device in Fixed Mobile Convergence (FMC) architecture having a first internet protocol (IP) address in a first network and a second IP address in a second network, comprising:
   detecting a presence of a network address translation (NAT) table;
   implementing, when the NAT table is present, a message exchange protocol on a femto base station or a security gateway to obtain a mapping between the first IP address and the second IP address, wherein the message exchange protocol comprises:
      obtaining the mapping via an encryption key exchange, wherein IP addresses and associated port numbers are included in a message exchanged in the encryption key exchange, and
      selectively notifying the mapping to a femto base station management server based on presence of the femto base station management server; and
   reporting, in a communication message, the mapping between the first IP address and the second IP address to a mobility management entity (MME).

2. The method of claim 1, wherein the encryption key exchange comprises leveraging Internet Key Exchange Version 2 (IKEv2).

3. The method of claim 2, wherein the leveraging of IKEv2 further comprises:
   embedding the IP addresses and the associated port numbers in an IKEv2 message header.

4. The method of claim 2, wherein the leveraging of IKEv2 further comprises:
   using Vendor ID Payload and Configuration Payload to introduce additional configuration attributes for the IP addresses and the associated port numbers.

5. The method of claim 1, the message exchange protocol further comprising:
   a client-server protocol, integrated into the encryption key exchange, for discovering any firewalls and address translations, determining types of the address translations being used, and learning IP addresses and port bindings allocated by the address translations.

6. The method of claim 5, wherein the client-server protocol comprises:
   a Session Traversal Utilities for Network Address Translation (STUN) protocol.

7. The method of claim 6, wherein the client-server protocol further comprises:
   embedding the STUN protocol into the encryption key exchange by modifying the encryption key exchange to support the STUN protocol.

8. The method of claim 6, wherein client-server protocol further comprises:
   implementing a separate STUN process on top of the encryption key exchange to send STUN binding requests.

9. An apparatus comprising one or more processors for facilitating operation of a communication device in Fixed Mobile Convergence (FMC) architecture having a first internet protocol (IP) address in a first network and a second IP address in a second network, further comprising:
   a femto base station that provides the communication device an access to the first network;
   a security gateway that facilitates secure communication for the communication device to the first network;
   a network address translation (NAT) table detector that detects a presence of a NAT table;
   an encryption key exchanger that obtains, when the NAT table is present, a mapping between the first IP address and the second IP address using a message exchange protocol implemented on the femto base station or the security gateway, where in the message exchange protocol comprises:
   obtaining the mapping via an encryption key exchange, wherein IP addresses and associated port numbers are included in a message exchanged in the encryption key exchange, and
   selectively notifying the mapping to a femto base station management server based on presence of the femto base station management server; and
   a mapping reporter that reports, in a communication message, the mapping between the first IP address and the second IP address a mobility management entity (MME).

10. The apparatus of claim 9, wherein the encryption key exchange comprises leveraging Internet Key Exchange Version 2 (IKEv2).

11. The apparatus of claim 10, wherein the leveraging of IKEv2 further comprises:
   embedding the IP addresses and the associated port numbers in an IKEv2 message header.

12. The apparatus of claim 10, wherein the leveraging of IKEv2 further comprises:
   using Vendor ID Payload and Configuration Payload to introduce additional configuration attributes for the IP addresses and the associated port numbers.

13. The apparatus of claim 9, the message exchange protocol further comprising:
   a client-server protocol, integrated into the encryption key exchange, for discovering any firewalls and address translations, determining types of the address translations being used, and learning IP addresses and port bindings allocated by the address translations.

14. The apparatus of claim 13, wherein the client-server protocol comprises:
   a Session Traversal Utilities for Network Address Translation (STUN) protocol.

15. The apparatus of claim 14, wherein the client-server protocol further comprises:

embedding the STUN protocol into the encryption key exchange by modifying the encryption key exchange to support the STUN protocol.

16. The apparatus of claim 14, wherein client-server protocol further comprises:
implementing a separate STUN process on top of the encryption key exchange to send STUN binding requests.

17. A computer program product comprising a non-transitory computer-readable medium having code stored thereupon, the code, when executed by a processor, causing the processor to facilitate operation of a communication device having a first internet protocol (IP) address in a first network and a second IP address in a second network, by:
detecting a presence of a network address translation (NAT) table;
implementing, when the NAT table is present, a message exchange protocol on a femto base station or a security gateway to obtain a mapping between the first IP address and the second IP address, wherein the message exchange protocol comprises:
obtaining the mapping via an encryption key exchange, wherein IP addresses and associated port numbers are included in a message exchanged in the encryption key exchange, and
selectively notifying the mapping to a femto base station management server based on presence of the femto base station management server; and
reporting, in a communication message, the mapping between the first IP address and the second IP address a mobility management entity (MME).

18. The computer program product of claim 17, wherein the encryption key exchange comprises leveraging Internet Key Exchange Version 2 (IKEv2).

19. The computer program product of claim 18, wherein the leveraging of IKEv2 further comprises:
embedding the IP addresses and the associated port numbers in an IKEv2 message header.

20. The computer program product of claim 18, wherein the leveraging of IKEv2 further comprises:
using Vendor ID Payload and Configuration Payload to introduce additional configuration attributes for the IP addresses and the associated port numbers.

21. The computer program product of claim 17, the message exchange protocol comprising:
a client-server protocol, integrated into the encryption key exchange, for discovering any firewalls and address translations, determining types of the address translations being used, and learning IP addresses and port bindings allocated by the address translations.

22. The computer program product of claim 21, wherein the client-server protocol comprises:
a Session Traversal Utilities for Network Address Translation (STUN) protocol.

23. The computer program product of claim 22, wherein the client-server protocol further comprises:
embedding the STUN protocol into the encryption key exchange by modifying the encryption key exchange to support the STUN protocol.

24. The computer program product of claim 22, wherein client-server protocol further comprises:
implementing a separate STUN process on top of the encryption key exchange to send STUN binding requests.

* * * * *